United States Patent
Liu et al.

(10) Patent No.: US 11,295,543 B2
(45) Date of Patent: Apr. 5, 2022

(54) OBJECT DETECTION IN AN IMAGE

(71) Applicant: International Business Machines Corporation, Armonk, NY (US)

(72) Inventors: Wen Liu, Beijing (CN); Shi Lei Zhang, Beijing (CN); Qin Shi, Beijing (CN); Songfang Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 16/835,600

(22) Filed: Mar. 31, 2020

(65) Prior Publication Data

US 2021/0303862 A1    Sep. 30, 2021

(51) Int. Cl.
| | |
|---|---|
| G06K 9/00 | (2022.01) |
| G06V 20/40 | (2022.01) |
| G06V 10/25 | (2022.01) |
| G06V 20/10 | (2022.01) |

(52) U.S. Cl.
CPC .............. *G06V 20/40* (2022.01); *G06V 10/25* (2022.01); *G06V 20/10* (2022.01); *G06V 2201/07* (2022.01)

(58) Field of Classification Search
None
See application file for complete search history.

(56) References Cited

U.S. PATENT DOCUMENTS

| | | | |
|---|---|---|---|
| 7,113,201 B1 | 9/2006 | Taylor et al. | |
| 9,495,591 B2* | 11/2016 | Visser | G06K 9/00624 |
| 10,489,670 B2* | 11/2019 | Diamond | G06K 9/00671 |
| 10,496,893 B2* | 12/2019 | Diamond | H04N 5/33 |
| 10,671,854 B1* | 6/2020 | Mahyar | G06N 3/0427 |
| 10,824,876 B2* | 11/2020 | Matsumoto | G08G 5/0082 |
| 2013/0238325 A1* | 9/2013 | Kristjansson | G10L 21/0208 704/226 |
| 2013/0272548 A1* | 10/2013 | Visser | G06K 9/4671 381/122 |
| 2014/0368643 A1* | 12/2014 | Siegel | G08B 13/19695 348/143 |

(Continued)

FOREIGN PATENT DOCUMENTS

| | | |
|---|---|---|
| CN | 108459311 A | 8/2018 |
| CN | 108734733 A | 11/2018 |

OTHER PUBLICATIONS

QinetiQ's EARS SWATS AKA IGDS: Shoulder mounted shot detection, https://www.thefirearmblog.com/blog/2017/08/10/qinetiqs-ears-swats-aka-igds-shoulder-mounted-shot-detection/ (Year: 2017).*

(Continued)

*Primary Examiner* — Feng Niu
(74) *Attorney, Agent, or Firm* — Patterson + Sheridan, LLP (57) ABSTRACT

Embodiments of the present disclosure relate to object detection in an image. In an embodiment, a computer-implemented method is disclosed. According to the method, image data representing a scene is obtained and sound distribution information related to the scene is obtained. A detection strategy to be applied in object detection is determined based on the sound distribution information. The object detection is performed on the image data by applying the detection strategy. In other embodiments, a system and a computer program product are disclosed.

20 Claims, 7 Drawing Sheets

(56) References Cited

U.S. PATENT DOCUMENTS

| | | | | |
|---|---|---|---|---|
| 2015/0134418 | A1* | 5/2015 | Leow | G06Q 50/01 |
| | | | | 705/7.34 |
| 2015/0249904 | A1* | 9/2015 | Weiss | H04W 4/027 |
| | | | | 455/456.1 |
| 2017/0053169 | A1* | 2/2017 | Cuban | G06V 10/42 |
| 2017/0132474 | A1* | 5/2017 | Matsumoto | G06K 9/00771 |
| 2017/0261593 | A1* | 9/2017 | Crocco | G06T 15/08 |
| 2017/0357263 | A1* | 12/2017 | Glatfelter | G05D 1/0246 |
| 2018/0046872 | A1* | 2/2018 | Diamond | G06K 9/00369 |
| 2018/0260647 | A1* | 9/2018 | Diamond | H04N 5/33 |
| 2019/0146054 | A1* | 5/2019 | Kato | G01S 3/808 |
| | | | | 367/125 |
| 2019/0188895 | A1* | 6/2019 | Miller, IV | G06V 40/19 |
| 2020/0134351 | A1* | 4/2020 | Diamond | G16H 40/63 |
| 2020/0178375 | A1* | 6/2020 | Rajagopalan | G01H 3/12 |
| 2020/0302951 | A1* | 9/2020 | Deng | G06V 20/00 |
| 2021/0049367 | A1* | 2/2021 | Matsumoto | H04N 5/23293 |
| 2021/0233539 | A1* | 7/2021 | Wexler | G06V 20/10 |

OTHER PUBLICATIONS

Antonacci et al. "Audio-based object recognition system for tangible acoustic interfaces," 978-1-4244-4218-8/09/ © 2009 IEEE.
Authors et al.: Disclosed Anonymously, "Method for sound classification and "noise" reduction in an augmented reality environment," IP.com No. IPCOM000199422D | IP.com Electronic Publication Date: Sep. 2, 2010.

* cited by examiner

FIG. 7

OBJECT DETECTION IN AN IMAGE

BACKGROUND

The present invention relates to computation version techniques, and more specifically, to a method, system, and computer program product for object detection in an image.

Object detection employs computer vision and image analysis techniques to detect semantic objects (such as humans, animals, or vehicles) in digital images and videos. Object detection techniques are often used, for example, for image retrieval, target tracking, security protection, and traffic monitoring. However, the conventional object detection systems and methods generally require a large amount of computing resources, are slow to detect objects, and inaccurate at times, especially in the scenario where on-line object detection is required.

SUMMARY

In a first aspect, one embodiment of the present invention provides a computer-implemented method. According to the method, image data representing a scene is obtained and sound distribution information related to the scene is obtained. A detection strategy to be applied in object detection is determined based on the sound distribution information. The object detection is performed on the image data by applying the detection strategy.

In a second aspect, one embodiment of the present invention provides a system. The system comprises a processing unit; and a memory coupled to the processing unit and storing instructions thereon. The instructions, when executed by the processing unit, perform acts of the method according to the above first aspect.

In a third aspect, one embodiment of the present invention provides a computer program product. The computer program product comprises a computer readable storage medium having program instructions embodied therewith, the program instructions executable by an electronic device to cause the electronic device to perform acts of the method according to the above first aspect.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
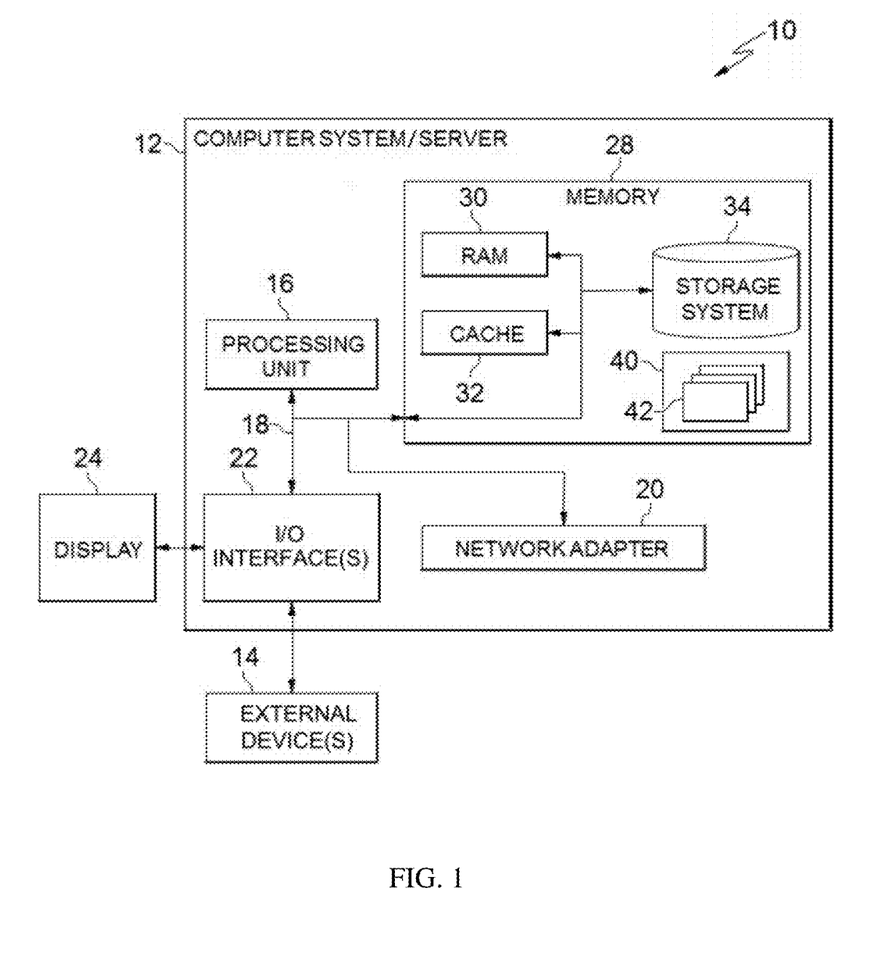
FIG. 1 depicts a cloud computing node according to some embodiments of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
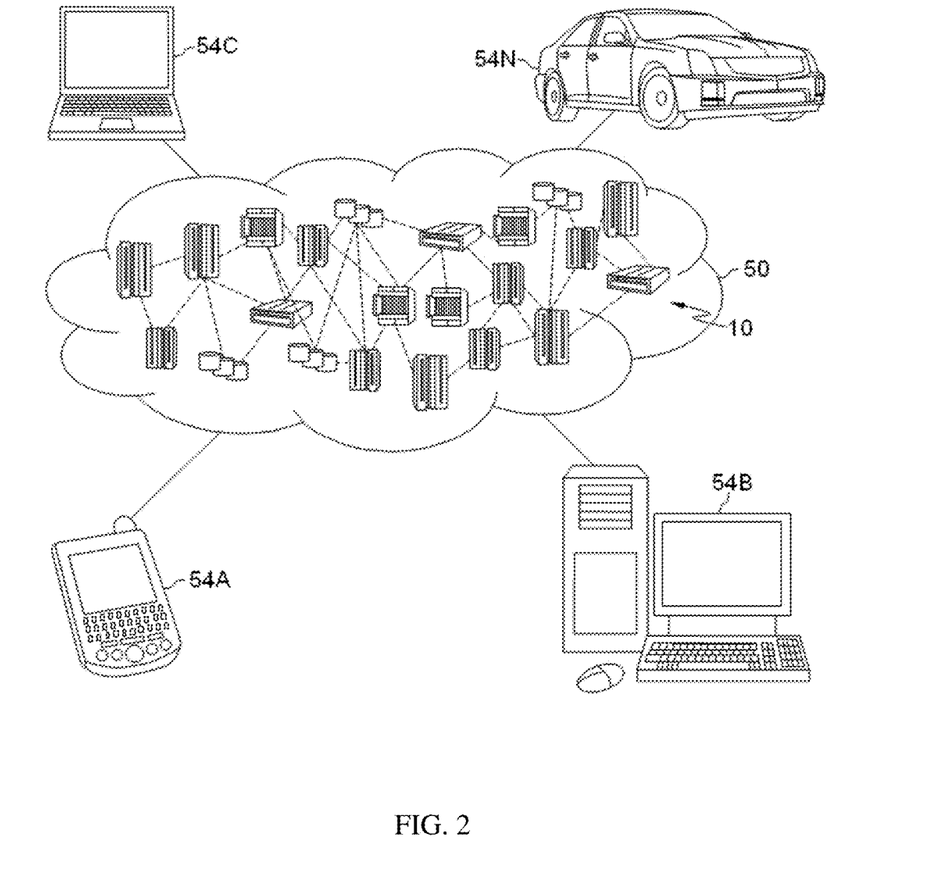
FIG. 2 depicts a cloud computing environment according to some embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
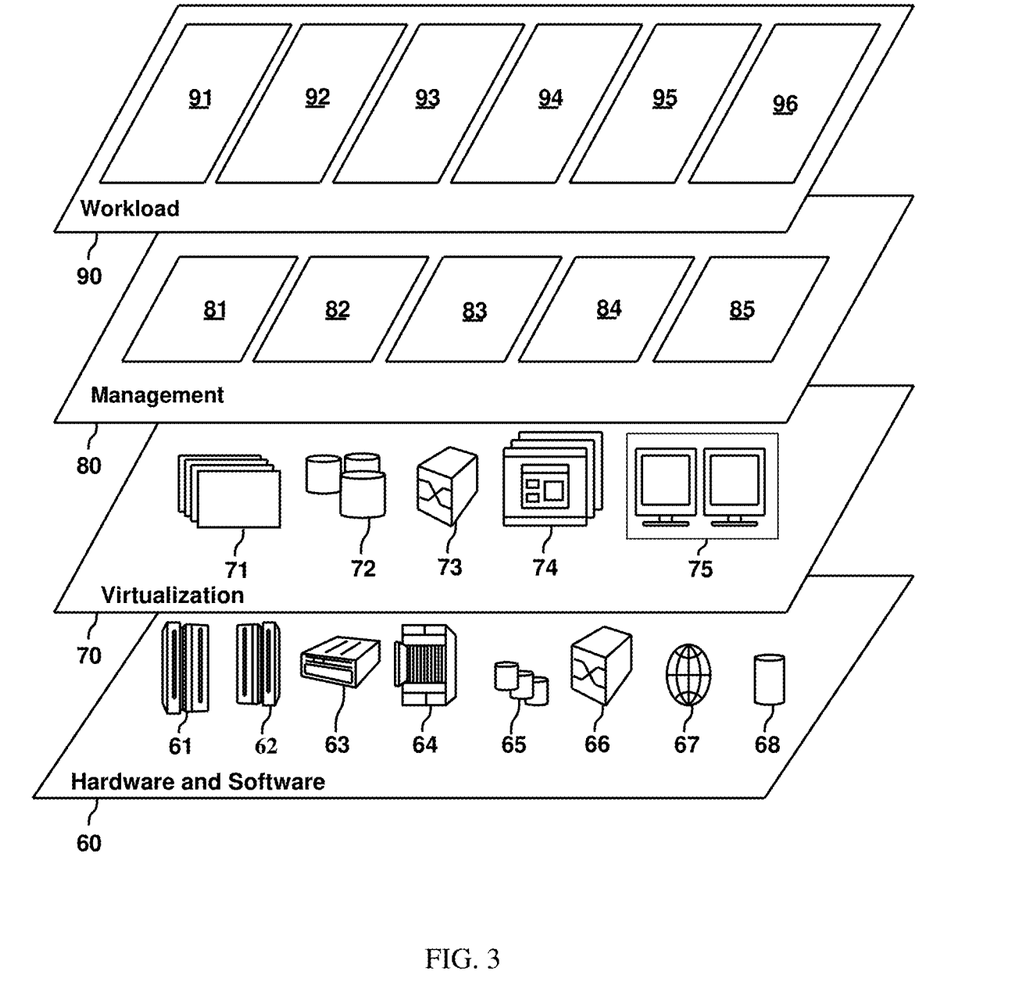
FIG. 3 depicts abstraction model layers according to some embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sound-aware object detection 96. The functionalities of sound-ware object detection will be described in the following embodiments of the present disclosure.

Object detection methods usually involve two stages. First, in a detection stage, image regions that contain candidates of target objects are detected or localized. Then, in a recognition stage, such regions are further analyzed to recognize a specific content. Various object detection algorithms have been developed. However, execution of the object detection algorithms usually requires an amount of computing resources. There is always a tradeoff between the detection accuracy and the computation resource costs or the detection speed. A need therefore exists for more computationally efficient and accuracy-preserved techniques for object detection.

According to example embodiments of the present invention, there is provided a solution for sound-aware object detection. According to this solution, to perform object detection on image data representing a scene, sound distribution information related to the scene is obtained and used to guide the object detection. A detection strategy is determined based on the sound distribution information. The object detection is performed on the image data by applying the determined detection strategy.

The sound distribution information is helpful in the object detection as it mimics human-like object detection. In real life, a real, patrolman, for example, would always hear a sound produced in a scene first and then search and focus on the source of the sound to check what happened. Through the solution for object detection proposed herein, the sound distribution information can be used to guide the object detection to focus on image regions that are of higher probabilities of representing a target object(s). Such sound-aware object detection can improve accuracy of the object detection, possibly improve the computation efficiency and reduce the computation power by allocating more computation resources to perform detection on the image regions of higher probabilities of representing a target object(s).

Some example embodiments of the present invention will be described in detail with reference to the accompanying figures.

Figure 4:
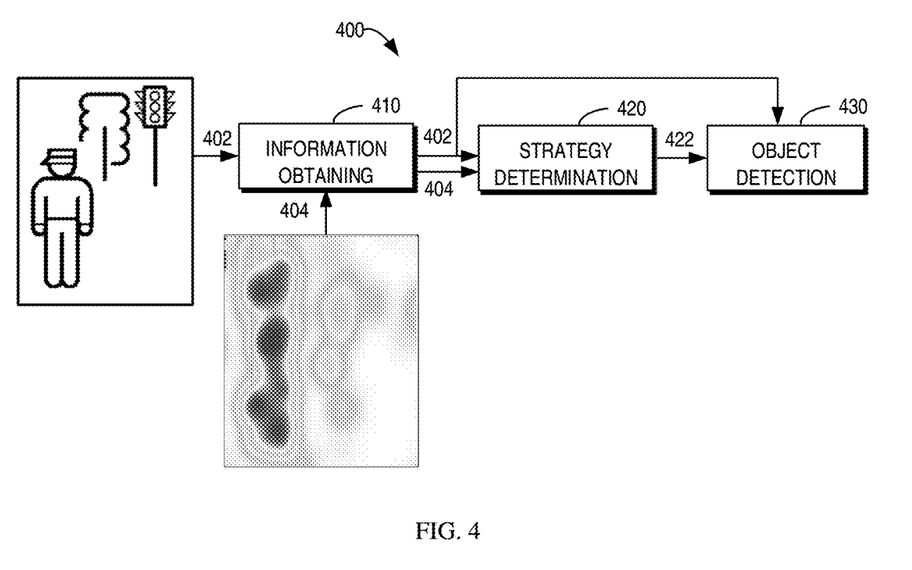
FIG. 4 depicts a block diagram of a system for soundware object detection according to some embodiments of the present invention.

Reference is now made to FIG. 4, which illustrates a block diagram of a system 400 for sound-ware object detection according to some embodiments of the present invention.

The system 400 includes an information obtaining module 410, a strategy determination module 420, and an object detection module 430. The system 400 may be implemented by computer system/server 12 of FIG. 1 and the modules 410 to 430 in the system 400 may be implemented in software, hardware, middleware, and/or any combination thereof.

Specifically, the information obtaining module 410 is configured to obtain image data 402 representing a scene. Object detection is to be performed on the image data 402. The image data 402 may include a separate digital image or consist of a sequence of consecutive digital image (i.e., a video). The image data 402 may capture or represent a part or a whole scene. For example, the image data 402 may represent a physical environment. In some embodiments, the image data 402 may be captured by one or more image capturing devices deployed in the scene, such as a camera, a panoramic camera, and/or the like.

The information obtaining module 410 is also configured to obtain sound distribution information 404 related to the scene. The sound distribution information indicates attribute values of one or more sounds produced in the scene. The sound distribution information may be generated from at least one sound signal captured in the scene, for example, captured together with the image data 402. The sound signal(s) may be obtained via one or more sound collecting devices deployed in the scene. The sound collecting device(s) may include, for example, one or more separate microphones, a plurality of microphones forming a microphone array, and/or the like. In some examples, the microphone array utilized may increase accuracy in capturing the sounds produced in the scene. Depending on the capabilities and/or deployment of the image capturing device(s) and the sound collecting device(s), the sound distribution information 404 may indicate a distribution of one or more sounds produced in a part of the scene represented by the image data or in a larger area than the scene represented by the image data.

In some embodiments, the information obtaining module 410 may receive the sound signal(s) from the one or more sound collecting devices and generate the sound distribution information from the sound signal(s). Alternatively, the sound signal may be processed and analyzed by a further module of the system 400 or in an external device or a sub-system from the system 400 and the resulting sound distribution information is then provided for the information obtaining module 410.

In some embodiments, the sound distribution information 404 may be represented in form of a heat map, as illustrated in the example of FIG. 4. In some embodiments, the sound distribution information 404 may include sound energy distribution information to indicate sound energy levels (or power levels) distributed across the scene. The sound energy distribution information may be represented as a heat map (sometimes referred to as a "first heat map" herein for purpose of discussion) of the scene with elements indicating the sound energy levels distributed across the scene. The elements of the first heat map may be corresponding to pixels in an image with values indicating the sound energy levels.

Various techniques can be applied to generate the sound energy distribution information. In some embodiments, energy levels at various directions and/or locations may be determined from the sound signal(s) captured from the scene. In some embodiments, the determined energy levels are then marked as corresponding values of the elements in the first heat map. For example, different energy levels may be represented by different values selected from a predetermined range of values, such as a normalized range from 0 to 1, a range from 0 to 255, and so on. In some example embodiments, the first heat map may be determined in such a manner that the higher a value of an element is, the higher a sound energy level at the corresponding element is, which means that the sound is louder.

Alternatively, or in addition, the sound distribution information 404 may include sound semantic distribution information to indicate semantic of one or more sounds produced in the scene. The sound semantic distribution information may be represented as a heat map (sometimes referred to as a "second heat map" herein for purpose of discussion) of the scene with elements indicating the semantic of sounds produced in the scene. The elements of the second heat map may be corresponding to pixels in an image with values indicating whether a predetermined semantic is produced. In some scenarios, the object detection aims to detect a target object that makes a sound with a specific semantic. For example, in a public place, one purpose of the object detection is to monitor whether any person is crying for help or whether a hazardous event happens. A semantic of a possible sound making in the concerned circumstance can be predetermined, for example, a sound carrying for help, a sound of a gun, a sound of explosion, and so on. In some embodiments, if more than one sound is of interest, semantic of those sounds can be predetermined. In an embodiment, the elements in the second heat map may be configured with different values to represent occurrence or absence of semantic of different sounds in the scene.

Various techniques can be applied to generate the sound semantic distribution information. In some embodiments, semantic of one or more sounds at various directions and/or locations may be determined from the sound signal captured from the scene, for example, by performing semantic analysis on the sound signal. In an embodiment, if a first sound with first predetermined semantic is detected to be produced in scene, an element in the second heat map may be marked as a first value indicating occurrence of the first sound with the first predetermined semantic. In an embodiment, if a second sound with second predetermined semantic is detected to be produced in scene, an element in the second heat map may be marked as a second value indicating occurrence of the second sound with the second predetermined semantic, the second value being different from the first value. For an element in the second heat map corresponding to a location in the scene where no sound of any predetermined semantic is detected, a third value different from either the first value or the second value is assigned to that element.

In some embodiments, in addition to the sound energy levels and/or the semantic of the sound(s), the sound distribution information 404 may further include direction information and/or location information of the one or more sounds produced in the scene. For example, the elements in the first heat map and/or the second heat map may indicate or may be associated with specific directions and/or locations in the scene.

The determination of the sound distribution information 404 related to the scene partially has been discussed above. The sound distribution information 404 is provided to the strategy determination module 420, which is configured to determine, based on the sound distribution information 404, a detection strategy 422 to be applied in object detection to be performed on the image data 402. In embodiments of the present invention, the sound distribution information 404 is used to determine or adjust the way the object detection is performed on the image data 402, for example, to determine or adjust an algorithm used for object detection of the image data 402. The detection strategy 422 may indicate how the object detection is performed.

In some embodiments, for purpose of computational efficiency, accuracy increase, and/or detection acceleration, it is desired that the object detection is focused on a limited amount of image data instead of the overall image data 402. To determine such a detection strategy 422, the sound distribution information 404 may be used to identify an amount of image data to which more attention should be paid when executing object detection. As mentioned above, the image data 402 may include at least one digital image. In some embodiments, the strategy determination module 420 may identify a region of interest in a digital image based on the sound distribution information. In some examples, the region of interest may be corresponding to an area where an expected sound is produced in the scene. Accordingly, the strategy determination module 420 may determine whether the expected sound is produced in the scene based on the sound distribution information in order to identify the region of interest.

The expected sound may be a sound with a sound energy level higher than a threshold level. The strategy determination module 420 may identify such an expected sound based on the sound energy distribution information (for example, the first heat map). Specifically, the strategy determination module 420 may determine whether the first heat map include at least one first element indicating a sound energy level higher than a threshold level. If the first heat map includes the at least one first element, the strategy determination module 420 may determine that the expected sound is produced in the scene. The expected sound is specifically produced in a geographic area of the scene corresponding to the at least one first element (where the geographic area may be indicated by the direction and/or location associated with the at least one first element in the first heat map).

In some embodiments, the expected sound may be a sound with predetermined semantic. The strategy determination module 420 may identify such an expected sound based on the sound semantic distribution information (for example, the second heat map). Specifically, the strategy determination module 420 may determine whether the second heat map includes at least one second element indicating a predetermined semantic in the scene. If the second heat map includes the at least one second element, the strategy determination module 420 may determine that the expected sound having the predetermined semantic is produced in the scene. The expected sound is specifically produced in a geographic area of the scene corresponding to the at least one second element (where the geographic area may be indicated by the direction and/or location associated with the at least one first element in the first heat map).

In some other embodiments, the expected sound may be identified as a sound having both a sound energy level higher than the threshold level and with predetermined semantic. In such embodiments, both the sound energy distribution information and the sound semantic distribution information may be used to determine the expected sound.

Figure 5:
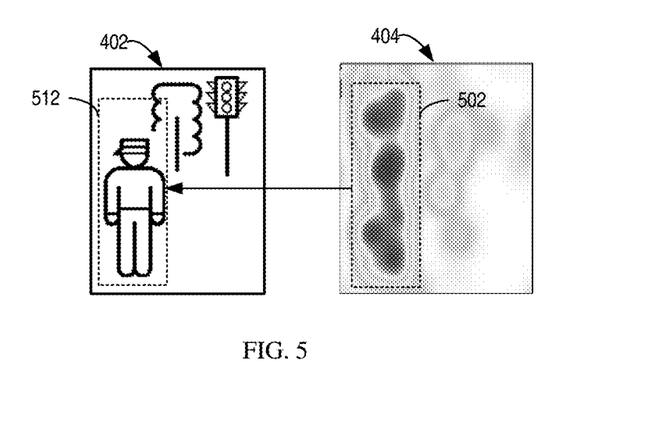
FIG. 5 depicts an example for determining a region of interest in an image according to some embodiments of the present invention.

With the expected sound identified, the strategy determination module 420 may further identify a region of interest in the digital image of the image data 402 that represents a geographic area of the scene where the expected sound is produced. The geographic area of the scene may be determined based on the one or more elements in the first or second heat map, as mentioned above. As shown in FIG. 5, in a heat map indicating the sound distribution information 404, a region 502 of the first heat map includes elements for identifying the expected sound. The strategy determination module 420 may then identify a corresponding region of interest 512 in the digital image of the image data 402 that represents the geographic area where the expected sound is produced, based on the region 502 in the heat map. In some embodiments, more than one discrete region of interest can be identified from the digital image of the image data 402.

The strategy determination module 420 may then determine the detection strategy 422 in which the object detection is enabled to be focused on or pay more attention to the region of interest. For example, finer or more complex object detection may be applied to the region of interest as compared with other image regions. This is because the region of interest may have a higher probability of representing or partially representing a target object to be detected. As such, instead of making equal efforts to detect a target object across the whole image or the whole video, the sound distribution information can help locate an important region(s) or frame(s) in a video on which the object detection should focus.

The determination of the detection strategy 422 will be further discussed in detail below. The object detection module 420 is configured to perform object detection on the image data 402 by applying the detection strategy 422. The object detection module 420 may apply various techniques or approaches for object detections, either currently utilized or to be developed in the future. In some examples, neural network (NN)-based object detection can be employed by the object detection module 420. For example, the object detection module 420 may use a trained NN model, such as a conventional neural network (CNN), a recurrent neural network (RNN), their variants, and/or any other type of NN models, to implement the object detection. It would be appreciated that other techniques than the NN models can also be utilized by the object detection module 420.

The detection strategy 422 is not intended to provide a brand new algorithm for the object detection, but to guide or adjust the detection to pay more attention to a certain part of the image data 402. In some embodiments, the detection strategy 422 is determined to decide or adjust one or more values of one or more parameters (referred to as "parameter values") applied in the object detection. In some embodiments, the detection strategy 422 may be determined for the individual digital image of the image data 402. To determine the detection strategy 422, the strategy determination module 420 may determine at least one parameter value to be applied in detecting a target object from the region of interest within the digital image. The parameter value(s) may be determined such that the object detection is to be focused on the region of interest, for example, finer object detection is to be performed, as compared with a remaining region of the digital image. The finer object detection generally requires more computation resources and complexity and/or results in a lower detection speed, but can generate an object result with higher accuracy.

The parameter value(s) configurable in the detection strategy 422 depends on a specific algorithm employed by the object detection module 430. Some examples of the parameter value(s) are provided in the following for purpose of illustration only and it would be appreciated that other parameter values are also possible to be determined for the region of interest.

According to an example approach for object detection, a candidate block is identified from an image and is analyzed to check whether a target object can be detected at least partially from the candidate block. In some embodiments, if the object detection module 430 requires selection of such candidate blocks from the digital image of the image data 402 in determining the detection strategy, the strategy determination module 420 may determine a parameter value (referred to as a "first parameter value" for purpose of discussion) to be applied for selecting candidate blocks for detecting the target object, such that more candidate blocks are selected from the region of interest than from a remaining region in the digital image by applying the first parameter value. That is, as the region of interest has a higher probability of representing or partially representing a target object according to the sound distribution information, it is worth to select more candidate blocks for detecting the target object.

In some embodiments, an original parameter value defined in the object detection for selecting a candidate block may be remained for the remaining region and be increased to be applied for the region of candidate. Alternatively, the original parameter value may be remained for the region of candidate but is reduced to a lower value for the remaining region.

Figure 6A:
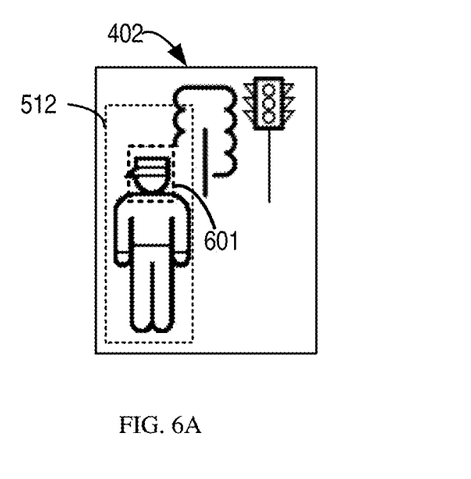
FIGS. 6A-6D depict examples for determining a detection strategy according to some embodiments of the present invention.

In some embodiments, the object detection is typically performed using a sliding window approach in which the entire digital image is searched by moving a sliding window across the image to bounding candidate blocks at respective positions. The sliding window may be moved with a step size. In such cases, if a sliding window is used in the object detection to be performed by the object detection module 430, in determining the first parameter value, the strategy determination module 420 may determine a size of a sliding window and/or a step size for moving a sliding window. The size of the sliding window and/or the step size used for the region of interest may be smaller than the corresponding size used for the remaining region in the digital image. For example, as shown in FIG. 6A, the strategy determination module 420 may determine a smaller size of a sliding window 601 for the region of interest 512 in the digital image of the image data 402. The step size of the sliding window 601 may also be a smaller value.

In some embodiments, a candidate block in an image is selected by means of scoring blocks and the one with a higher score is selected. To determine the first parameter value, the strategy determination module 420 may alternatively or additionally determine a scoring criterion applied in selecting candidate blocks such that one or more blocks in the region of interest can have a higher score and thus are more likely to be selected as the candidate blocks. In an embodiment, the scoring criterion may be determined such that one or more larger weights are assigned to the blocks in the region of interest and/or one or more smaller weights are assigned to the blocks outside of the region of interest, to ensure that the resulting scores for the blocks in the region of interest have higher scores than the blocks outside of the region of interest. The weights assigned to the blocks may be determined based on the (average) sound energy levels as indicated in the first heat map and/or the occurrence of the predetermined semantic as indicated by the second heat map. For example, a larger weight may be assigned to a block with a higher (average) sound energy level and/or the predetermined semantic produced therein.

Figure 6B:
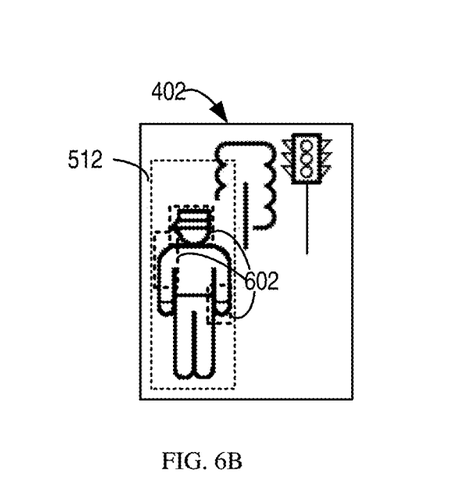

In some embodiments, the object detection module 430 may be configured to perform selective search for detecting a target object from an image. During the selective search, bounding boxes with different sizes are used to localize blocks in the images and the blocks that are determined to belong to parts of the target object may be merged for a final decision. In such cases, in determining the first parameter value, the strategy determination module 420 may alternatively or additionally determine one or more sizes of one or more bounding boxes for selective search. The size(s) of the bounding boxes for selective search in the region of interest may be determined to be smaller than those for selective search in the remaining region in the digital image of the image data 402. For example, as shown in FIG. 6B, the strategy determination module 420 may determine smaller sizes of bounding boxes 602 for the region of interest 512 in the digital image of the image data 402. As such, the region of interest may be searched with finger granularity as compared with the remaining region.

In some embodiments, instead of applying the first parameter value to the region of interest in the digital image of the image data 402 only, the first parameter value may be determined to be applied for the whole digital image of the image data where the region of interest is detected. As such, determining, by one or more processors, a first parameter value to be applied for selecting candidate blocks for detecting the target object, such that more candidate blocks are selected from the digital image than from a further digital image in which no region of interest is detected. Here, a region of interest refers to a region representing a geographic area where an expected sound is produced.

Figure 6C:
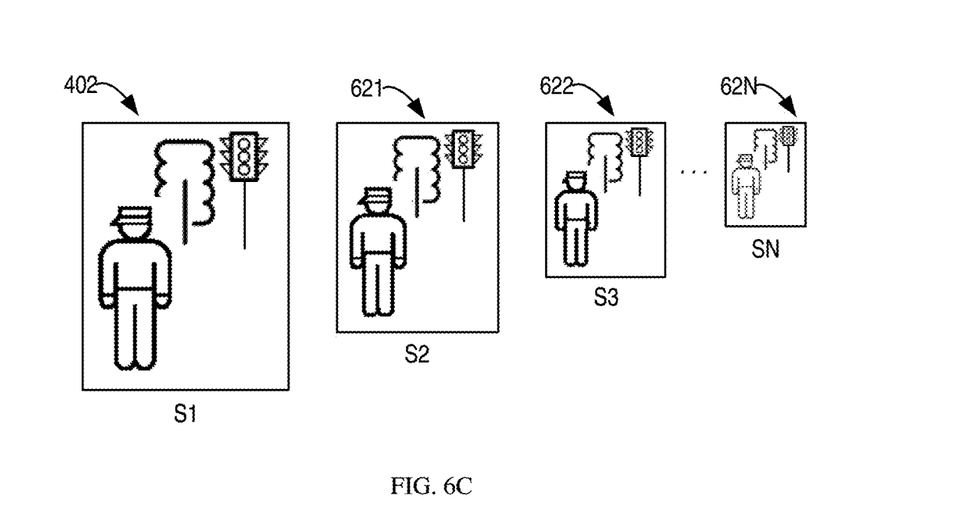

In some cases, the object detection module 430 may be configured to apply image pyramid-based object detection on the digital image of the image data 402. Generally speaking, according to the image pyramid-based object detection, the object detection module 430 may scale the digital image of the image data 402 or a region of the digital image with different scaling levels in order to explore features represented in the digital image at different image sizes. In such cases, in addition to the first parameter value, or as an alternative, the object detection module 430 may be configured to determine a parameter value (referred to as a "second parameter value" for purpose of discussion) to be applied for scaling of the digital image in the object detection, such that more scaling levels are to be applied for scaling the digital image than for scaling a further digital image without the region of interest. For example, as shown in FIG. 6C, the strategy determination module 420 may determine N scaling levels S1, S2, S3, . . . , SN to scale the digital image of the image data 402 as the original digital image of the image data 402, image 621, image 622, image 623, . . . , image 62N, respectively, where N is an integer larger than one and S1 may be a scaling factor of 100%. More scaling levels being applied means that more complex processing is required to analyze the resulting scaled images, but higher accuracy is possible.

Figure 6D:
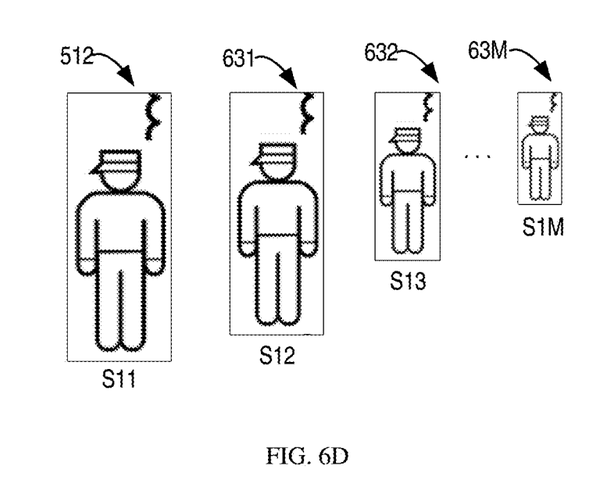

Alternatively, the object detection module 430 may be configured to determine a parameter value (referred to as a "third parameter value" for purpose of discussion) to be applied for specifically scaling the region of interest, such that more scaling levels are to be applied for scaling the region of interest than for scaling a remaining region in the digital image. For example, as shown in FIG. 6D, the strategy determination module 420 may determine M scaling levels S11, S12, S13, . . . , S1M to scale the region of interest 512 in the digital image of the image data 402 as the original region of interest 512, image 631, image 632, image 633, . . . , image 63M, respectively, where M is an integer larger than one and S11 may be a scaling factor of 100%.

In some embodiments, the image data 402 may include a video consisting of consecutive digital images (also known as "frames"). In determining the detection strategy 422 for the video, if the expected sound is detected to be produced in a digital image of the video, the strategy determination module 420 may determine a frame rate for the video for sampling frames adjacent to the digital image from in a clip of the video to perform the object detection. The frame rate may be determined as a high value (for example, higher than a frame rate for sampling frames in a further clip of the video where no expected sound is detected). That is, instead of analyzing each frame of the video, the object detection is focused on a frame (i.e., the digital image) where the expected sound is detected and its adjacent frames. For other frames in the video from which no expected sound is detected, those frames are sampled less frequently in order to reduce the computation cost for the object detection.

Figure 7:
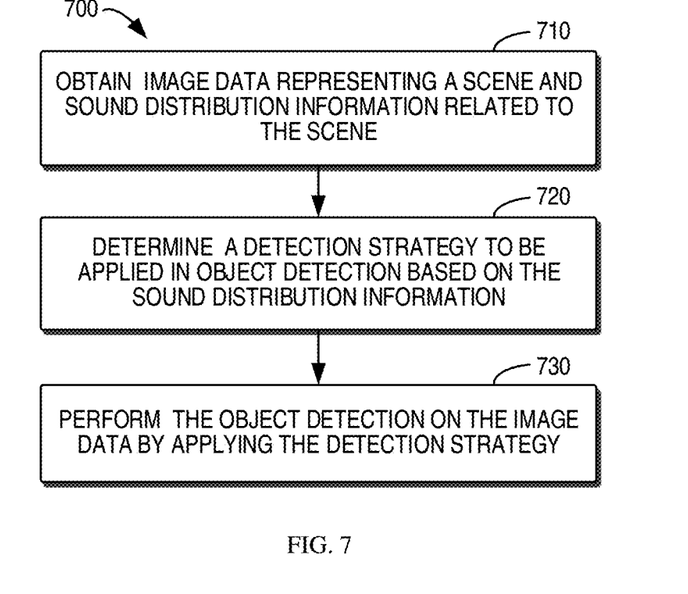
FIG. 7 depicts a flowchart of an example method according to some embodiments of the present invention.

FIG. 7 shows a flowchart of an example method 700 according to some embodiments of the present invention. The method 700 can be implemented at the system 400. For the purpose of discussion, the method 700 will be described with reference to FIG. 4.

At block 710, the system 400 obtains image data representing a scene and sound distribution information related to the scene. At block 720, the system 400 determines a detection strategy to be applied in object detection based on the sound distribution information. At block 730, the system 400 performs the object detection on the image data by applying the detection strategy.

In some embodiments, obtaining the sound distribution information comprises: obtaining at least one sound signal from at least one sound collecting device deployed in the scene; and generating the sound distribution information from the at least one sound signal.

In some embodiments, the image data comprises a digital image of the scene, and determining the detection strategy comprises: identifying a region of interest in the digital image based on the sound distribution information; and determining the detection strategy in which the object detection is enabled to be focused on the region of interest.

In some embodiments, identifying the region of interest comprises: determining whether an expected sound is produced in the scene based on the sound distribution information; and in accordance with the expected sound being determined, identifying a region of the digital image representing a geographic area of the scene where the expected sound is produced as the region of interest.

In some embodiments, the sound distribution information comprises a first heat map of the scene with elements indicating sound energy levels distributed across the scene, and determining whether the expected sound is produced comprises: determining whether the first heat map comprises at least one first element indicating a sound energy level higher than a threshold level; and in accordance with a determination that the first heat map comprises the at least one first element, determining that the expected sound is produced in the scene.

In some embodiments, the sound distribution information comprises a second heat map of the scene with elements indicating semantic of at least one sound produced in the scene, and determining whether the expected sound is produced comprises: determining whether the second heat map comprises at least one second element indicating a predetermined semantic in the scene; and in accordance with a determination that the second heat map comprises the at least one second element, determining that the expected sound having the predetermined semantic is produced in the scene.

In some embodiments, determining the detection strategy in which the object detection is enabled to be focused on the region of interest comprises at least one of the following: determining at least one parameter value to be applied in detecting a target object from the region of interest within the digital image; and in accordance with a determination that the image data comprises a video, determining a frame rate for the video for sampling frames adjacent to the digital image from in a clip of the video to perform the object detection, the frame rate being higher than a frame rate for sampling frames in a further clip of the video.

In some embodiments, determining the at least one parameter value comprises at least one of the following: determining a first parameter value to be applied for selecting candidate blocks for detecting the target object, such that more candidate blocks are selected from the region of interest than from a remaining region in the digital image; determining a second parameter value to be applied for scaling of the digital image in the object detection, such that more scaling levels are to be applied for scaling the digital image than for scaling a further digital image without the region of interest; and determining a third parameter value to be applied for scaling of the region of interest, such that more scaling levels are to be applied for scaling the region of interest than for scaling a remaining region in the digital image.

In some embodiments, the first parameter value comprises at least one of a size of a sliding window, a step size for moving a sliding window, a scoring criterion, and a size of a bounding box for selective search.

It should be noted that the processing of sound-aware object detection (or achieved by the system for sound-ware object detection) according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining, by one or more processors, image data representing a scene and sound distribution information related to the scene, wherein the sound distribution information comprises a first heat map of the scene and a second heat map of the scene, wherein the first heat map comprises elements indicating sound energy levels distributed across the scene, and wherein the second heat map comprises elements indicating a semantic meaning of at least one sound produced in the scene;
    determining, by one or more processors, a detection strategy to be applied in an object detection based on the sound distribution information, wherein the detection strategy comprises focusing on regions of interest, and wherein determining the detection strategy comprises:
        determining whether a first element in the sound distribution information has a predefined semantic meaning; and
        upon determining that the first element in the sound distribution information has the predefined semantic meaning, identifying a corresponding region of a digital image of the scene as a region of interest; and
    performing, by one or more processors, the object detection on the image data by applying the detection strategy.

2. The method of claim 1, wherein obtaining the sound distribution information comprises:

obtaining, by one or more processors, at least one sound signal from at least one sound collecting device deployed in the scene; and generating, by one or more processors, the sound distribution information from the at least one sound signal.

3. The method of claim 1, wherein the image data comprises the digital image of the scene, and determining the detection strategy comprises:

identifying, by one or more processors, the region of interest in the digital image based on the sound distribution information; and determining to focus on the region of interest.

4. The method of claim 3, wherein identifying the region of interest comprises:

determining, by one or more processors, whether an expected sound is produced in the scene based on the sound distribution information; and in accordance with the expected sound being determined, identifying, by one or more processors, a region of the digital image representing a geographic area of the scene where the expected sound is produced as the region of interest.

5. The method of claim 4, wherein determining whether the expected sound is produced comprises:

determining, by one or more processors, whether the first heat map comprises at least one second element indicating a sound energy level higher than a threshold level; and in accordance with a determination that the first heat map comprises the at least one second element, determining, by one or more processors, that the expected sound is produced in the scene.

6. The method of claim 4, wherein determining whether the expected sound is produced comprises:

determining, by one or more processors, whether the second heat map comprises at least one third element indicating a predefined semantic meaning in the scene; and in accordance with a determination that the second heat map comprises the at least one third element, determining, by one or more processors, that the expected sound having the predefined semantic meaning is produced in the scene.

7. The method of claim 3, wherein focusing on the region of interest comprises at least one of the following:

determining, by one or more processors, at least one parameter value to be applied in detecting a target object from the region of interest within the digital image; or in accordance with a determination that the image data comprises a video, determining, by one or more processors, a frame rate for the video for sampling frames adjacent to the digital image from a clip of the video to perform the object detection, the frame rate being higher than a frame rate for sampling frames in a further clip of the video.

8. The method of claim 7, wherein determining the at least one parameter value comprises at least one of the following:

determining, by one or more processors, a first parameter value to be applied for selecting candidate blocks for detecting the target object, such that more candidate blocks are selected from the region of interest than from a remaining region in the digital image;

determining, by one or more processors, a second parameter value to be applied for scaling of the digital image in the object detection, such that more scaling levels are to be applied for scaling the digital image than for scaling a further digital image without the region of interest; or determining, by one or more processors, a third parameter value to be applied for scaling of the region of interest, such that more scaling levels are to be applied for scaling the region of interest than for scaling a remaining region in the digital image.

9. The method of claim 8, wherein the first parameter value comprises at least one of a size of a sliding window, a step size for moving a sliding window, a scoring criterion, or a size of a bounding box for selective search.

10. A system comprising:

a processing unit; and a memory coupled to the processing unit and storing instructions thereon, the instructions, when executed by the processing unit, performing acts comprising:

obtaining image data representing a scene and sound distribution information related to the scene, wherein the sound distribution information comprises a first heat map of the scene and a second heat map of the scene, wherein the first heat map comprises elements indicating sound energy levels distributed across the scene, and wherein the second heat map comprises elements indicating a semantic meaning of at least one sound produced in the scene;

determining a detection strategy to be applied in an object detection based on the sound distribution information, wherein the detection strategy comprises focusing on regions of interest, and wherein determining the detection strategy comprises:

determining whether a first element in the sound distribution information has a predefined semantic meaning; and upon determining that the first element in the sound distribution information has the predefined semantic meaning, identifying a corresponding region of a digital image of the scene as a region of interest; and performing the object detection on the image data by applying the detection strategy.

11. The system of claim 10, wherein obtaining the sound distribution information comprises:

obtaining at least one sound signal from at least one sound collecting device deployed in the scene; and generating the sound distribution information from the at least one sound signal.

12. The system of claim 10, wherein the image data comprises the digital image of the scene, and determining the detection strategy comprises:

identifying the region of interest in the digital image based on the sound distribution information; and determining to focus on the region of interest.

13. The system of claim 12, wherein identifying the region of interest comprises:

determining whether an expected sound is produced in the scene based on the sound distribution information; and in accordance with the expected sound being determined, identifying a region of the digital image representing a geographic area of the scene where the expected sound is produced as the region of interest.

14. The system of claim 13, wherein determining whether the expected sound is produced comprises:

determining whether the first heat map comprises at least one second element indicating a sound energy level higher than a threshold level; and in accordance with a determination that the first heat map comprises the at least one second element, determining that the expected sound is produced in the scene.

15. The system of claim 13, wherein determining whether the expected sound is produced comprises:
   determining whether the second heat map comprises at least one third element indicating a predefined semantic meaning in the scene; and
   in accordance with a determination that the second heat map comprises the at least one third element, determining that the expected sound having the predefined semantic meaning is produced in the scene.

16. The system of claim 12, wherein focusing on the region of interest comprises at least one of the following:
   determining at least one parameter value to be applied in detecting a target object from the region of interest within the digital image; or
   in accordance with a determination that the image data comprises a video, determining a frame rate for the video for sampling frames adjacent to the digital image from a clip of the video to perform the object detection, the frame rate being higher than a frame rate for sampling frames in a further clip of the video.

17. The system of claim 16, wherein determining the at least one parameter value comprises at least one of the following:
   determining a first parameter value to be applied for selecting candidate blocks for detecting the target object, such that more candidate blocks are selected from the region of interest than from a remaining region in the digital image;
   determining a second parameter value to be applied for scaling of the digital image in the object detection, such that more scaling levels are to be applied for scaling the digital image than for scaling a further digital image without the region of interest; or
   determining a third parameter value to be applied for scaling of the region of interest, such that more scaling levels are to be applied for scaling the region of interest than for scaling a remaining region in the digital image.

18. The system of claim 17, wherein the first parameter value comprises at least one of a size of a sliding window, a step size for moving a sliding window, a scoring criterion, or a size of a bounding box for selective search.

19. A computer program product, the computer program product comprising a computer readable storage medium having program instructions embodied therewith, the program instructions executable by an electronic device to cause the electronic device to perform acts comprising:
   obtaining image data representing a scene and sound distribution information related to the scene, wherein the sound distribution information comprises a first heat map of the scene and a second heat map of the scene, wherein the first heat map comprises elements indicating sound energy levels distributed across the scene, and wherein the second heat map comprises elements indicating a semantic meaning of at least one sound produced in the scene;
   determining a detection strategy to be applied in an object detection based on the sound distribution information, wherein the detection strategy comprises focusing on regions of interest, and wherein determining the detection strategy comprises:
      determining whether a first element in the sound distribution information has a predefined semantic meaning; and
      upon determining that the first element in the sound distribution information has the predefined semantic meaning, identifying a corresponding region of a digital image of the scene as a region of interest; and
   performing the object detection on the image data by applying the detection strategy.

20. The computer program product of claim 19, wherein the image data comprises the digital image of the scene, and determining the detection strategy comprises:
   identifying the region of interest in the digital image based on the sound distribution information; and
   determining to focus on the region of interest.

* * * * *